United States Patent

[11] 3,596,267

[72] Inventor David J. Goodman
Keyport, N.J.
[21] Appl. No. 794,494
[22] Filed Jan. 28, 1969
[45] Patented July 27, 1971
[73] Assignee Bell Telephone Laboratories, Incorporated
Murray Hill, Berkeley Heights, N.J.

[54] DIGITAL CODE CONVERTER FOR CONVERTING A DELTA MODULATION CODE TO A DIFFERENT PERMUTATION CODE

7 Claims, 5 Drawing Figs.

[52] U.S. Cl. 340/347 DD, 235/154, 325/42
[51] Int. Cl. H03k 13/32, G06f 5/00
[50] Field of Search 325/325, 42, 38 A; 340/347, 348; 235/154; 178/26

[56] References Cited
UNITED STATES PATENTS

| | | | |
|---|---|---|---|
| 3,405,235 | 10/1968 | Carter | 235/153 X |
| 3,445,771 | 5/1969 | Clapham et al. | 325/42 |
| 3,463,911 | 8/1969 | Dupraz et al. | 340/146.1 X |

*Primary Examiner*—Daryl W. Cook
*Assistant Examiner*—Michael K. Wolensky
*Attorneys*—R. J. Guenther and E. W. Adams, Jr.

ABSTRACT: A delta modulation to other permutation code signal converter comprises a shift register and up-down counter in series. The counter produces a permutation code output indicative of the running history of the delta modulation input, while the shift register, through weighted coefficient multipliers, produces correction signals to reduce the noise content of the counter output.

TABLE I

| | | | | | |
|---|---|---|---|---|---|
| REQUIRED COEFFICIENT ACCURACY ($L^*$) | 3 | 3 | 4 | 6 | 7 |
| NUMBER OF COEFFICIENTS (N) | 2 | 4 | 8 | 16 | 32 |

TABLE II

CONVERTER COEFFICIENTS (N=4)

| n | $a_n$ | $a_m$ | $a_m$(BINARY) | m |
|---|---|---|---|---|
| -2 | 0.15996 | 0.15996 | 0.001 | 0 |
| -1 | 0.22575 | 0.38571 | 0.011 | 1 |
| 0 | 0.22866 | 0.61437 | 0.101 | 2 |
| 1 | 0.22575 | 0.84013 | 0.111 | 3 |
| 2 | 0.15996 | | | |

INVENTOR
D. J. GOODMAN
BY
ATTORNEY

PATENTED JUL 27 1971 3,596,267

SHEET 2 OF 5

PATENTED JUL 27 1971 3,596,267

DIGITAL CODE CONVERTER FOR CONVERTING A DELTA MODULATION CODE TO A DIFFERENT PERMUTATION CODE

This invention relates to digital message transmission systems and, more particularly, to such systems which employ both delta modulation and pulse code modulation.

BACKGROUND OF THE INVENTION

In its most common form, delta modulation (ΔM) produces a train of single valued positive and negative pulses, or, as is more often the case, a pulse train of "1's" and "0's," indicative of the instantaneous amplitude difference between the message waveform being encoded and the integrated pulse train. Where the instantaneous amplitude of the message waveform is greater than the output of the integrator into which the pulse train is fed, a positive pulse is generated. When the amplitude of the message waveform is less than the integrator output, a negative pulse (or no pulse) is produced. At the receiver, the transmitted train of pulses controls the polarity of locally generated pulses, which are in turn applied to an integrator, the output of which, after appropriate filtering, is a reproduction of the original message waveform.

In a single integration delta modulation system as just described, transmission quality, and hence the reproduced message, suffers from quantizing noise and overload distortion. Quantizing noise results from the finite size of the amplitude steps in the integrator output, thereby preventing the system from sensing small changes in message waveform amplitude, and overload distortion results from the inability of the system to follow rapid changes in the instantaneous amplitude of the message waveform. In addition, for a reasonable fidelity of reproduction of the original message, delta modulation requires a high sampling rate and, consequently, a large transmission bandwidth. On the other hand, delta modulation can be implemented by reasonably simple circuitry in both the analog-to-digital and digital-to-analog conversions, circuitry which can readily be embodied in integrated circuits. As a consequence, delta modulation is an excellent choice for use in subscriber loop systems where, because of the large numbers involved, size and economy of manufacture are important.

Pulse code modulation (PCM) systems produce a pulse train that is a binary, or other base, linear representation of the message waveform. The message waveform is periodically sampled, and the amplitude of the sample is quantized and encoded as, for example, a binary code group. Signal quality in a PCM system also suffers from quantizing noise; however, when the parameters of a transmission system are chosen to give an optimum of quality, expressed as signal-to-noise ratio, pulse code modulation requires considerably less transmission bandwidth than does delta modulation, and hence is better suited for trunk circuits where large numbers of signals are transmitted.

In a telephony system where central offices are connected by trunks, and each central office services a plurality of subscriber lines, a system wherein delta modulation is used for the subscriber loops and pulse code modulation is used for the trunk circuits utilizes each form of signal transmission in the milieu to which it is best suited. Such a system consists, for example, of a delta modulation encoder and a PCM encoder separated by a circuit for producing an analog reproduction of the original signal from the delta modulation pulse train. Thus a certain redundancy of mode conversion is present, and the advantages of simplicity of encoding by the delta modulation circuit are lost since the use of the complicated analog to PCM converter is still required.

SUMMARY OF THE INVENTION

The present invention eliminates the necessity for a conventional, complicated PCM encoder which is required when decoding the delta modulation signal before PCM encoding, thereby taking advantage of the relatively simple delta modulation encoding by converting the delta modulation signal directly into PCM format. While the invention is best illustrated by reference to a PCM format, conversion to permutation codes other than binary PCM is within the scope of the invention.

In a preferred embodiment of the invention, the converter which operates on the ΔM signal comprises a shift register and an up-down counter in series with each other. The shift register has a plurality of weighted taps which add or subtract prespecified binary coefficient values, depending upon the polarity of the ΔM pulse at the tap. The up-down counter follows the original message input, adding or subtracting one from its binary output total in accordance with the polarities of the delta modulation signal. At any instant the output of the counter is an approximation of the original message in the chosen permutation code such as, for example, binary code and contains the quantizing and overload distortion noise present in the ΔM signal. On the other hand, the output of the shift register is a correction signal in the permutation code generated through an instantaneous sampling of several digits of the ΔM pulse train prior to their sequential application to the counter.

In accordance with the invention, the outputs of the taps and of the counter are fed to an accumulator where the counter output is refined by the outputs of the taps and the noise content is thereby reduced. The accumulator is periodically sampled at the PCM transmission rate to produce an encoded PCM version of the delta modulation signal. The refinement of the counter output by the shift register outputs improves the accuracy of the permutation code representation to meet the system quantizing noise requirements.

The coefficient values of the shift register are determined mathematically by a statistical least squares procedure, resulting in an inverse relationship between the number of coefficients and the delta modulation sampling rate for a fixed level of output quantizing noise. This relationship makes it possible to design the converter to produce any degree of output quantizing noise within a broad range, or to maintain a predetermined noise level with a variety of speeds and converter complexities.

The basic converter of the invention may be used with a delta modulator as a general purpose PCM encoder, in which the simplicity of delta modulation in analog-to-digital conversion is exploited, as well as a delta modulation to PCM converter.

The principles and features of the present invention will be more readily understood from the following detailed description, taken in conjunction with the accompanying drawings.

DETAILED DESCRIPTION

Figure 1:
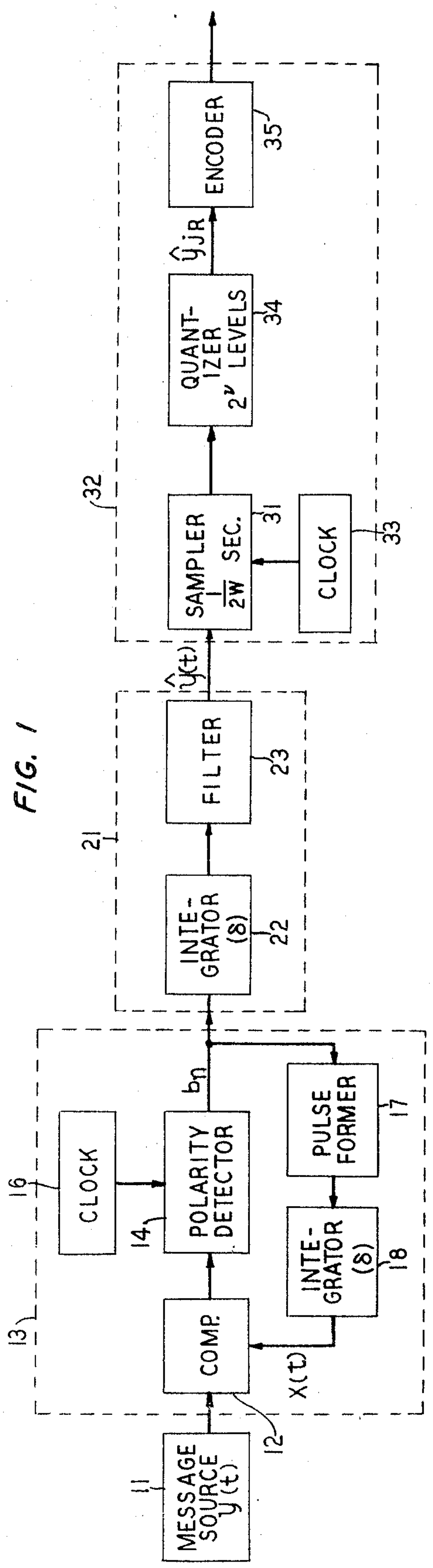
FIG. 1 is a block diagrammatic view of a ΔM to PCM converter utilizing the present state of the art.

With the present state of the art, a ΔM to PCM system would be as shown in FIG. 1, wherein a source 11 of a message $y(t)$ is connected to one input of the comparator 12 of the delta modulator 13. Comparator 12 is a two-input circuit which delivers an output having a polarity indicative of the difference between its two inputs. This output is applied to a polarity detector 14 which, under the control of clock source 16, samples the output of comparator 12 and delivers one or the other of two binary states at its own output, depending upon the polarity of the output of comparator 12. These binary states ($b_n$) represent the useful output of the delta modulator and are transmitted as the ΔM signal. At the same time, the output $b_n$ of the polarity detector is connected to a pulse forming circuit which converts one binary state into a positive pulse and the other binary state into a negative pulse. The output of the pulse former 17 is applied to an integrator 18, the output of which is a step function of step size $\delta$, which is applied to the comparator 12, where it is compared with incoming signal $y(t)$.

The delta modulator 13 as described is of conventional design. Other types of delta modulators, or other arrangements of component parts might readily be used to produce a typical ΔM output. For purposes of the discussion to follow, it will be assumed that the ΔM output is a binary pulse train $b_n$ having a bit rate of $1/\tau$. Another basic parameter of the system thus far described is the step size $\delta$ of the integrator output. $\delta$ is selected to provide a proper balance between quantizing noise, which predominates for high values of $\delta$, and slope overload noise, which is the predominant noise for low $\delta$.

The output binary pulse train $b_n$ of modulator 13 is applied to the input of a converter 21 which comprises an integrator 22 and a filter 23. Integrator 22 is substantially identical to integrator 18 of modulator 13, and filter 23 is a low pass filter which removes the high frequency components of the integrator output. The output of converter 21 is a reconstruction $\hat{y}(t)$ of the original input waveform $y(t)$.

Converter output $\hat{y}(t)$ is supplied to a sampling circuit 31 of a PCM modulator 32, where it is sampled under control of a clock 33 at the rate of $1/2W$ where $W$ is the highest frequency of the message signal. The output of sampler 31 is applied to a quantizer circuit 34 where it is quantized to one of the preassigned PCM levels and then to a PCM encoder, where the quantized samples are encoded in, for example, a seven digit binary code. The conversion from ΔM to PCM is greatly simplified if the ΔM rate $1/\tau$ and the PCM sampling rate $1/2W$ are integrally related, where their ratio is given by $$R=1/2W\tau \qquad (1)$$

where $R$ is an integer, designated the bandwidth expansion ratio.

From the foregoing, it can be seen that the arrangement of FIG. 1 involves a redundancy in that the original message, or an approximation thereof, is recreated during the conversion process.

Figure 2:
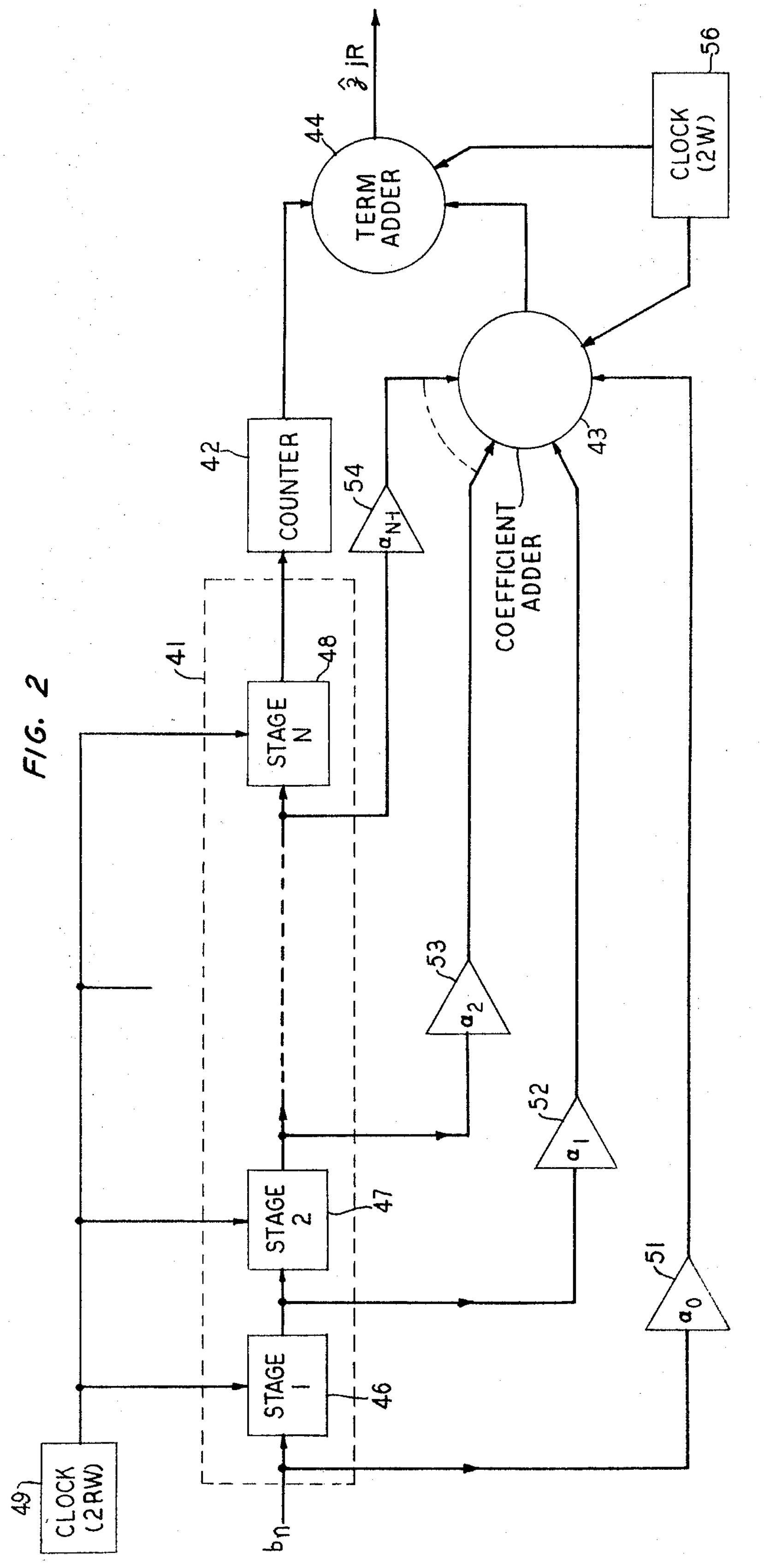
FIG. 2 is a block diagrammatic view of a ΔM to PCM converter embodying the principles of the present invention.

In accordance with the principles of the present invention, an illustrative embodiment of which is shown in FIG. 2, the redundancy inherent in the conversion process as illustrated in FIG. 1 is eliminated and the noise content of the PCM output signal is controlled by the design parameters of the conversion circuit and made to conform to the PCM transmission standards by a direct digital conversion of the ΔM signal to the PCM output signal.

The converter of FIG. 2 is designed to take the place of the elements 21 and 32 of FIG. 1. For simplicity, the delta modulator has not been shown, so that the input to the converter of FIG. 2 is the pulse train $b_n$, the output of the delta modulator, while the output of the converter is the PCM or other permutation coded signal $\hat{z}_{jR}$. The arrangement of FIG. 2 comprises a shift register 41, an up-down counter 42, a coefficient adder 43, and a term adder 44.

Shift register 41 comprises N stages 46, 47, 48 which may take any of a number of forms known in the art, such as, for example, simple flip-flops, under the control of a clock 49 which produces timing pulses at the ΔM rate (2RW). At any sampling instant N sequential digits of the $b_n$ pulse train are stored in the register, and the state of each stage of the register is determined by the polarity of the pulse, or the presence or absence of a pulse, in that stage.

The stages of the registers are connected to weighted coefficient digital multipliers 51, 52, 53, 54, which may take any of a number of forms well known in the art, such as, for example, read only memories in which the coefficient values are stored in digital form. Each digital multiplier produces a digital output in the desired permutation code indicative of the state of the shift register stage to which it is connected. The method of determining the multiplication factor of each multiplier will be discussed more fully hereinafter. The outputs of the N digital multipliers are fed to the coefficient adder 43, where they are summed to produce a correction signal based upon an interpolation of the ΔM pulse train.

The ΔM pulse train, after passing through the shift register, is applied to the up-down counter 42, which produces a continuous summation of the ΔM signal in digital form, adding or subtracting bits in accordance with the polarity, or presence or absence, of the ΔM pulses. The output of the up-down counter is a permutation code signal containing the noise components inherent in the ΔM signal. At any instant of time, the up-down counter is responding to a single bit, $b_n$, of the ΔM signal while the shift register is examining the next N bits that are to be applied to the up-down counter and generating corrective signals based upon an interpolation of these pulses to correct the raw signal output of the up-down counter. The up-down counter may take any of a number of forms, e.g., a plurality of sequentially disposed flip-flop circuits producing addition and subtraction of digits in the coded output. Such circuits are within the purview of workers in the art, and the actual structure forms no part of the present invention.

The output of the counter 42 is fed to term adder 44, and the coefficient adder 43 output is also applied to the term adder at the PCM or other code rate $1/2W$, controlled by clock 56. Adder 44 combines the digital output of the counter 42 with the digital corrective signals from adder 43 to produce a refined PCM output with, as will be apparent hereinafter, a signal-to-noise ratio that meets the requirements of the system in which the converter is used. Other arrangements, such as a combination of Boolean logic circuits, may be used to accomplish the same operations as the multipliers and term adder.

In designing a circuit to produce a direct conversion from ΔM to, for example PCM, design flexibility will be achieved if the ΔM sampling rate and the converter complexity, as determined by the value of N, i.e., the number of stages, are inversely related. Analysis has shown that determination of coefficient values for the shift register 41 on the basis of a simulation of the analog system of FIG. 1 does not achieve this end. However, determination of the coefficient values by a minimum mean square error analysis produces the desired relationship so that it is possible to trade off circuit complexity with ΔM sampling rate to achieve a design especially suited to the particular application.

The PCM output of FIG. 2 may be considered a statistical estimate of the sample $y_{jR}$ of the analog message $y(t)$, taken at the time $t=jR\tau=j/2W$, in which $j$ is the PCM indexing indicator, $t$ is time, $\tau$ is the ΔM sampling time and $2W$ is the PCM sampling rate. Because $x(t)$, the integrated ΔM signal, approximates $y(t)$, the sample values $x_n=x(n\tau)$ of $x(t)$ are useful data in the estimation of $y_{jR}$. Specifically the data used to estimate $y_{jR}$ are $x_{jR}$ which approximates $y_{jR}$ and the samples $x_{jR+1}, x_{jR-1}, \ldots, x_{jR+M}, x_{jR-M}$, generated for $M\tau$ seconds before and after the occurrence of $x_{jR}$.

The linear estimate $\hat{y}_{jR}$ is the weighted sum of the selected data in which $a_k$ is the weight of $x_{jR-k}$. Thus, $$\hat{y}_{jR}=\sum_{k=-M}^{M} a_k x_{jR-k} \qquad (2)$$

In this analysis, the binary ΔM symbols, $b_n$, are assumed to have weight +1 or −1 so that $x_k$ is proportional to the sum of all $b_n$ up to and including $b_k$ $$x_k=\delta \sum_{n=-\infty}^{k} b_n \qquad (3)$$

Equations (2) and (3) may be combined to show $\hat{y}_{jR}$ as a function of $b_n$, $$\hat{y}_{jR}=\delta \sum_{n=-M}^{\infty} g_n b_{jR-n} \qquad (4)$$

in which the coefficients of the binary symbols are related to the $a_k$ by $$g_n=\delta\sum_{k=-M}^{n} a_k \text{ for } -M\le n\le M \qquad (5)$$

$$g_n=\delta\sum_{k=-M}^{M} a_k \text{ for } n\ge M. \qquad (5a)$$

Because $g_n$ is constant for $n>M$, equation (3) may be rewritten as $$\hat{y}_{jR}=\sum_{n=-M}^{M-1} g_n b_{jR-n}+g_M\sum_{n=M}^{\infty} b_{jR-n} \qquad (6)$$

In order to simplify the implementation of equation (2) it is possible to divide equation (6) by $g_M$ and take as the desired PCM sample, $$\hat{z}_{jR}=\hat{y}_{jR}/g_M=\sum_{n=-M}^{M-1}(g_n/g_M)b_{jR-n}+\sum_{n=M}^{\infty} b_{jR-n} \qquad (7)$$

In (7) the index of summation may be changed from $n$ to $m=n+M$ to produce $$\hat{z}_{jR}=\sum_{m=0}^{N-1}\alpha_m b_{jR+M-n}+\sum_{n=N}^{\infty} b_{jR+M-n} \qquad (8)$$

in which $N=2M$ and $$\alpha_m=g_{m-M}/g_M. \qquad (9)$$

The second term of equation (7) is realized by the up-down counter 42 operating on the ΔM input, delayed by $N\tau$ seconds while the first term is the weighted sum of the outputs of the tapped binary shift register 41. Thus (8) gives the relationship of $\hat{z}_{jR}$, the output of FIG. 2, to the input. The foregoing analysis proves that $\hat{z}_{jR}$ is proportioned to the statistical estimate $\hat{y}_{jR}$. The coefficients $\alpha_m$ of FIG. 2 may be calculated from the estimator coefficients $a_k$ by $$\alpha_m=\frac{\sum_{k=-M}^{m-M} a_k}{\sum_{k=-M}^{M} a_k}\quad m=o,\ \ldots,\ N-1, \qquad (10)$$

which is a combination of equations (5) and (9).

The following discussion describes the means of determining the set of coefficients $a_{-M}, \ldots, a_o, \ldots, a_M$ which result in minimal PCM quantizing noise at the output of FIG. 2.

The mean square estimation error of equation (2) may be written $$\eta=E\{(y_{jR}-\hat{y}_{jR})^2\} \qquad (11)$$

where $E\{\cdot\}$ is the expectation operator. Equation (11) can be expanded to give $$\eta=\sigma^2-2\sum_{k=-M}^{M}a_kE\{y_{jR}x_{jR-k}\}+\sum_{k=-M}^{M}\sum_{m=-M}^{M}a_ka_mE\{x_{jR-k}x_{jR-m}\} \qquad (12)$$

where $\sigma$ is the rms value of $y(t)$
$k$ is a first index
and $m$ is a second index.

The expectation in the single summation in equation (12) is the cross-covariance function of $(y_{jR})$ and $(x_n)$ and the expectation in the double summation is the auto-covariance function of $(x_n)$. It can be shown that if $y(t)$ is a member of a stationary ensemble, the sequence of samples $x_n$ is also stationary, in which case we may adopt the notation $$\Phi_k=E\{y_{jR}x_{jR-k}\} \qquad (13)$$

which depends only upon $k$ for the cross-covariance and $$r_u=E\{x_{jR-k}x_{jR-m}\} \qquad (14)$$

where $u=m-k$, for the auto-covariance. With this notation, equation (12) can be expressed in matrix notation $$\eta=\sigma^2-2A^T\Phi+A^T\Psi A \qquad (15)$$

where $\Phi$ and $A$ are defined as column vectors ($N+1\times1$ matrices) with components $\Phi_k$ and $a_k(-M\le k\le M)$ respectively, $\psi$ is the $N+1\times N+1$ auto-covariance matrix with components $$\Psi_{k,m}=r_{m-k}(-M\le k,\ m\le M) \qquad (16)$$

and $A^T$ is the transpose of vector A. It can be shown that if the mean value of $y(t)$ is zero, which is generally the case, the coefficients for which $\eta$ is minimized are given by $$A^*=\Psi^{-1}\Phi \qquad (17)$$

and the minimal mean square error is $$\eta_{min}=\sigma^2-\Phi^T\Psi^{-1}\Phi \qquad (18)$$

In order to solve equation (17) to obtain the coefficients $a_n$, it is necessary to ascertain the ΔM covariance statistics which depend on the statistical properties of the analog input and on the delta modulation parameters, $\delta$ and $\tau$. The determination of $a_n$ on the basis of assumptions that are applicable to a broad class of practical design situations will now be demonstrated. The assumptions are:

1. The input, $y(t)$, is a member of a stationary Gaussian ensemble with power spectral density function $Y(f)$.
2. The delta modulator is designed so that slope overload effects are negligible.

Under these assumptions the covariance functions, $\Phi_k$ and $r_u$ may be expressed in terms of $\beta=\delta/\sigma$, the step size expressed as a multiple of the RMS signal and $\rho_k$ the covariance coefficients of the analog input:

$$\rho_k=\frac{2}{\sigma^2}\int_0^W Y(f)\cos(2\pi kf\tau)df. \qquad (19)$$

In general, the ΔM step size is a small fraction of the RMS input signal, in which case the cross-covariance is very accurately given by $$\Phi_0=\sigma^2 \qquad (20)$$

and $$\Phi_\mu=\sigma^2\rho_\mu \qquad (21)$$

and the auto-covariance by $$r_o=\sigma^2+\delta^2/3 \qquad (22)$$

and $$r_u=\rho_u\sigma^2+\frac{2\delta^2}{\pi^2}\sum_{k=1}^{\infty}\frac{(-1)^{uk}}{k^2}\exp\left[\frac{\pi^2k^2(1-\rho_u)}{\beta^2}\right] \qquad (23)$$

Equation (17) becomes $$A^*=\begin{bmatrix} r_0, r_1, r_2, \ldots, r_N \\ r_1 r_0 \\ r_2 \\ \cdot \\ \cdot \\ r_N, r_{N-1} \ldots r_0 \end{bmatrix}^{-1}\times\begin{bmatrix}\sigma^2\rho_0\\ \cdot \\ \cdot \\ \sigma^2\rho_N\end{bmatrix} \qquad (24)$$

the solution of which gives the coefficients $a_n$ in analog form, from which, by means of equation (10), the set of coefficients $\alpha_n$ can be ascertained.

Figure 3:
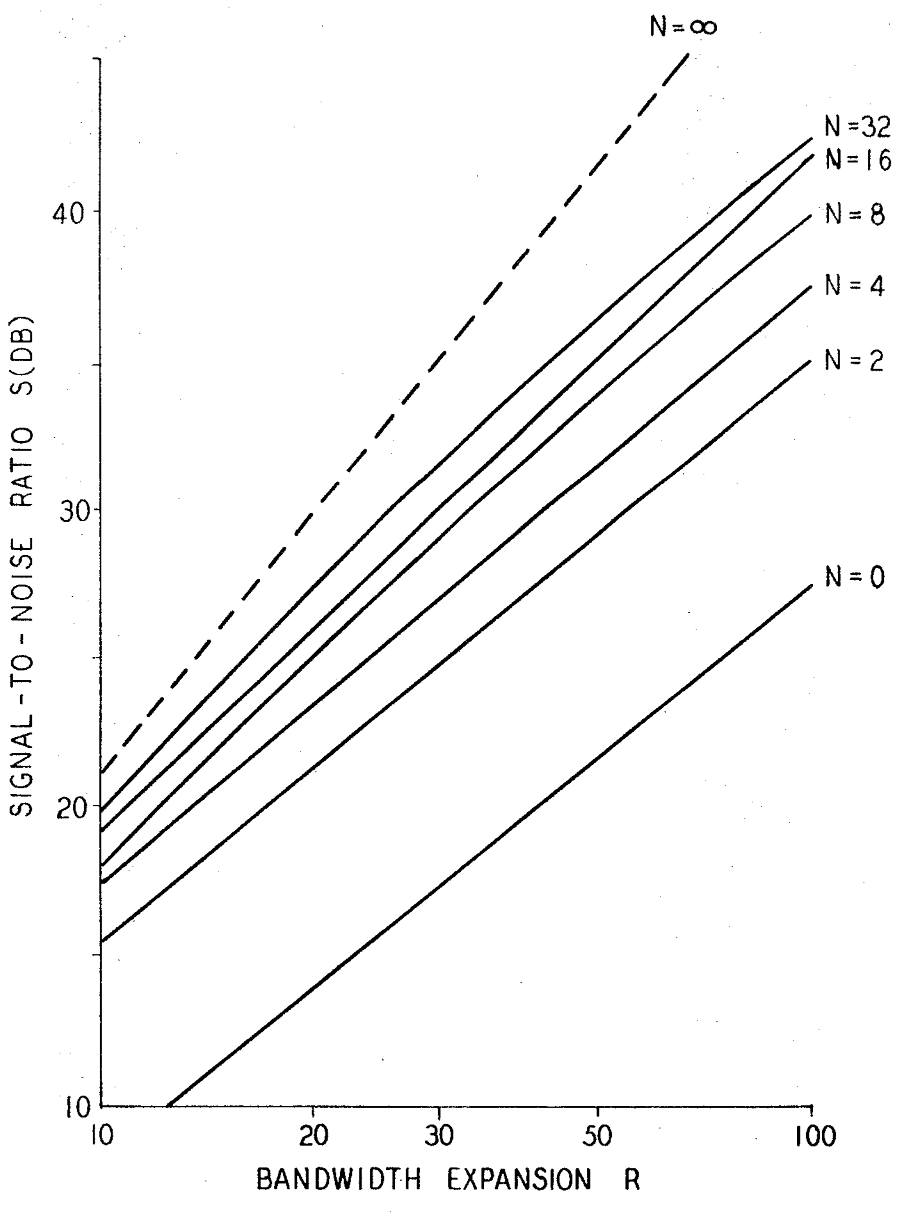
FIGS. 3, 4 and 5 are graphs of certain parameters of the converter of FIG. 2 for a variety of input signals.

FIG. 3 is a graph constructed from equation (18) relating the three parameters $N$, $R$, and $S$ where $S$ is the signal-to-noise ratio, given by $$S=\frac{\sigma^2}{\eta_{min}} \qquad (25)$$

In a practical design procedure, $S$ is the independent variable, specified according to system fidelity criteria. With $S$ fixed, $N$ and $R$ vary inversely and in practice their values are chosen as a compromise between the objectives of achieving low $\Delta M$ speed (low $R$) and a simple converter structure (low $N$). FIG. 3 pertains to a system whose Gaussian input has a flat spectrum band limited to W Hz. The solid curves show S as a function of R for various values of N, and the broken curve indicates the result of optimal analog processing of the indicated ΔM signal, corresponding to the signal-to-noise ratio of a transversal filter with an unlimited number of stages. On the other hand, the lowest curve (N=0) corresponds to a converter that consists of the up-down counter alone. For N=4 (four stage shift register and up-down counter), there is an approximate 9 db. increase in signal-to-noise ratio over the N=0 case, or, for a fixed S the ΔM speed required is reduced to approximately one-third of that required for the N=0 case.

The data presented in FIG. 3 relates to an analog estimate with analog coefficients. In accordance with the present invention, these analog coefficients are converted to their digital equivalents. In a practical application, it is desirable to round off the coefficients to a reasonable number of digital places. With the restriction that the digitalization of the coefficients is not allowed to degrade the signal-to-noise ratio by more than 0.5 db., the minimum number of binary places L* is that minimum L for which the inequality $$10 \log [\eta(L)/\eta_{min}] < 0.5 \qquad (26)$$

is valid over all $R \geq 10$ of practical interest, where $$\eta(L) = \sigma^2 - 2[A(L)]^T \Phi A(L) + [A(L)]^T \psi A(1) \qquad (27)$$

As a result of inequality (26) and equation (27), Table I is obtained which is valid for $R \geq 10$. Table I indicates, for example, that for a four stage converter, three place digital coefficients give sufficient accuracy to maintain the signal-to-noise ratio to within 0.5 db. of the optimal value.

The shift register portion of the converter may be viewed as a filter which rejects the out-of-band components of the error signal of the ΔM process. As the number of stages is increased, the output noise power is reduced. Alternatively, the shift register may be considered as an estimator of a random variable which bases its estimates on an increasing number of correlated data as N increases while the output noise power decreases. Finally, the shift register, or filter, may be viewed as an interpolater. As the number of filter stages increases, the ΔM speed may be decreased and a proportionally greater step size may be tolerated in the delta modulator. The resolution of the ΔM signal is thus reduced while the accuracy of the PCM output is maintained due to the interpolation performed by the filter between increasingly separated ΔM quantization levels.

Figure 4:
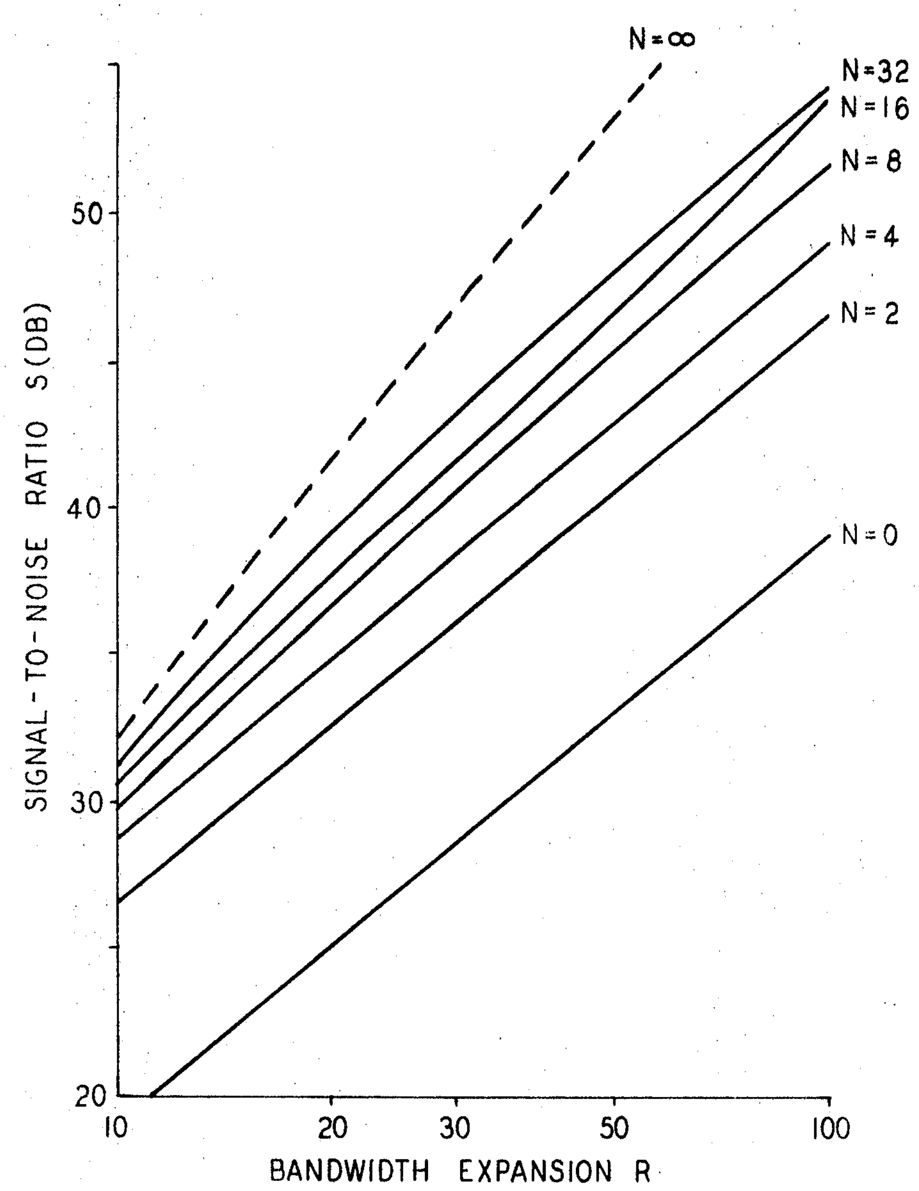
Figure 5:
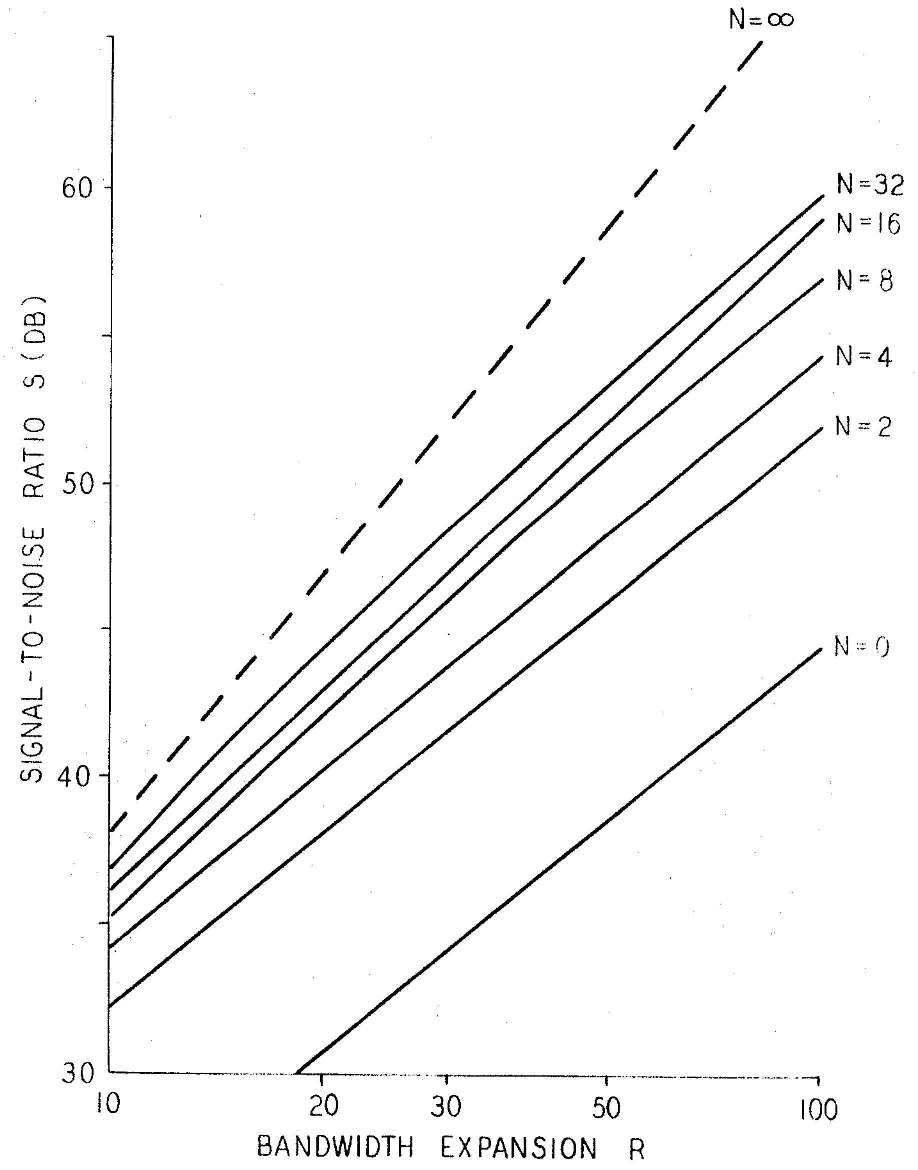

The curves of FIG. 3 as pointed out before, relate to the processing of input signals having a flat band-limited spectrum. FIG. 4 is a graph of curves which relate to signals with the spectral shape of speech or broadcast television signals and FIG. 5 relates to PICTUREPHONE® signals. The curves of FIGS. 4 and 5 are quite similar to those of FIG. 3, with some vertical translation.

As a converter design example, assume that the input signal has a spectrum corresponding to speech signals, and that a signal-to-noise ratio of 41 db. is required. From FIG. 4 it can be seen that a converter in which N=4 and R=40 produces the required signal-to-noise ratio. Other values of N could, of course, be chosen. An N of 4 represents a reasonable compromise between complexity and sampling rate. Table II gives the optimal coefficients, as determined from equations (10), (17), (18), and (26). The arithmetic operations of the converter, i.e., multiplication of the coefficients by ±1 and addition of the coefficients and the addition of their sum to the output of the counter need be performed only at the PCM rate, or once for every 40 ΔM inputs. As a consequence, the coefficient multipliers and adders of the converter can be time shared among several signals. It has been found that the coefficient values given in Table II are generally applicable regardless of the spectrum of the input signal and the sampling rate of the delta modulator, hence time sharing among signals with different spectra is possible.

It is to be understood that the arrangements described in the foregoing are illustrative of the application of the principles of the invention. Numerous other arrangements may be devised by those skilled in the art without departing from the spirit and scope of the invention.

I claim:

1. In a digital message transmission system having a transmitting terminal and a receiving terminal, a delta modulator at the transmitting terminal for sampling and encoding the message to be transmitted in a binary pulse train, a converter for converting the binary pulse train directly to a permutation code signal having a plurality of digit combinations different from said delta modulation signal, said converter comprising a first means for shifting the permutation code signal in one direction in response to one condition of the delta modulation signal and in the opposite direction in response to another condition of the delta modulation signal, and second means for modifying the permutation code signal generated by said first means to conform to the system noise requirements by sampling the delta modulation pulse train in advance of its introduction into said first means and generating correcting pulses in the said permutation code, means for combining the outputs of said first and second means to produce a modified signal, and means for sampling and transmitting to said receiving terminal the modified signal at the permutation code rate.

2. In a digital transmission system having a transmitting and a receiving terminal, the combination as claimed in claim 1 wherein the delta modulation sampling rate and the permutation code rate are given by $$R = 1/2W\tau$$

where $1/\tau$ is the delta modulation sampling rate, $1/2W$ is the permutation code sampling rate, $R$ is an integer, and $W$ is the highest frequency of the message being encoded.

3. In a digital transmission system having a transmitting and a receiving terminal, the combination as claimed in claim 1 wherein said first converter means comprises means for producing an output based upon the history of the delta modulation signal and the second converter means comprises means for producing an output that is an interpolation of a plurality of pulses of the delta modulation signal.

4. A converter for converting a delta modulation signal to a different permutation code signal comprising a shift register and an up-down counter in series, said shift register having a plurality of stages, each stage being connected to a weighted coefficient digital multiplier, the coefficient value of each multiplier being determined in part by the particular stage of the shift register to which it is connected, the outputs of said up-down counter and said digital multipliers being coded in the particular permutation code desired, and means for combining the outputs of the digital multipliers and the up-down counter to produce an output signal in the aforementioned permutation code.

5. A converter as claimed in claim 4 wherein said means for combining the outputs comprises a coefficient adder in which the outputs of said digital multipliers are combined and a term adder for combining the output of said up-down counter and the output of said coefficient adder.

6. A converter as claimed in claim 5 wherein the output of the up-down counter is given by the expression $$\sum_{n=N}^{\infty} b_{jR+M-n}$$

where $N$ is the number of stages in the shift register, $b_n$ is the delta modulation pulse train, $j$ is the permutation code indexing indicator, $M$ is one-half of $N$, and $R$ is an integer given by $$R = 1/2W\tau$$

where $W$ is the highest frequency of the message signal to be encoded and $1/\tau$ is the delta modulation sampling rate.

7. A converter as claimed in claim 6 wherein the output of the coefficient adder is given by $$\sum_{m=0}^{N-1} \alpha_m b_{jR+M-n}$$

where $m = n + M$ and $$\alpha_m = \frac{\sum_{k=-M}^{m-M} a_k}{\sum_{k=-M}^{M} a_k} \quad m = 0, \ldots, N-1$$

where $a_k$ are the coefficient weighting factors and $\alpha_m$ are the weighted coefficients of the digital multipliers.